United States Patent

Miller et al.

[15] 3,688,298

[45] Aug. 29, 1972

[54] PROPERTY PROTECTION SYSTEM EMPLOYING LASER LIGHT

[72] Inventors: Peter Miller, Chicago; Charles G. Call, Deerfield, both of Ill.

[73] Assignee: Security Systems, Inc.

[22] Filed: May 13, 1970

[21] Appl. No.: 36,899

[52] U.S. Cl..................340/258 B, 250/217, 340/276
[51] Int. Cl................................................G08b 13/18
[58] Field of Search..............340/258 B, 228 S, 276; 250/221, 222, 209, 205, 217; 352/106 LR

[56] References Cited

UNITED STATES PATENTS

| 3,335,285 | 8/1967 | Gally, Jr. et al. | 340/258 B |
| 3,321,632 | 5/1967 | Wood | 250/209 |
| 3,370,285 | 2/1968 | Cruse et al. | 340/258 B |
| 3,365,572 | 1/1968 | Strauss | 340/258 X |
| 3,537,027 | 10/1970 | Smith | 356/106 LR |
| 3,065,455 | 11/1962 | Roth | 340/258 B |

*Primary Examiner*—John W. Caldwell
*Assistant Examiner*—Marshall M. Curtis
*Attorney*—Lettvin and Gerstman

[57] ABSTRACT

A system for protecting an area employing a laser light source. A monochromatic coherent beam of light from the laser light source is directed around the perimeter of the area to be protected in a series of paths. A photo cell is stationed at the end of the path of laser light for deactivating the laser and actuating an alarm signal when the beam of light is broken by an object such as an intruder moving through the beam. The laser is deactivated in order to safeguard the intruder, innocent or otherwise, and a reset device is provided for initiating the operation of the laser.

2 Claims, 4 Drawing Figures

PATENTED AUG 29 1972
3,688,298
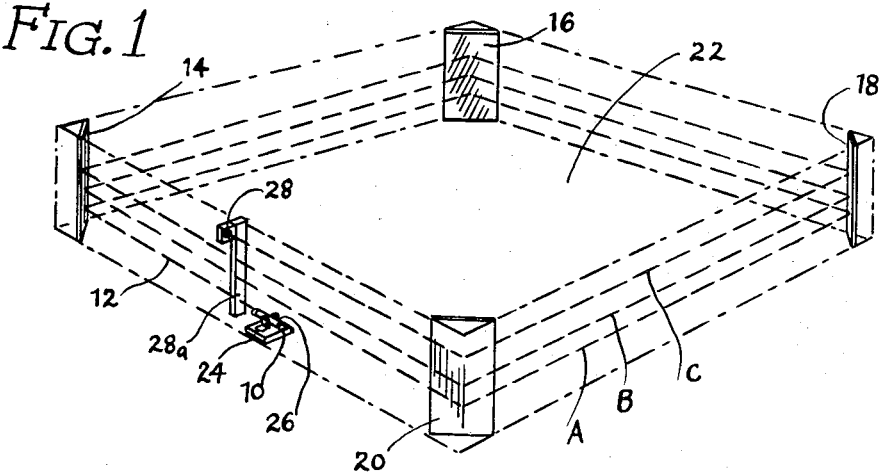
FIG. 1
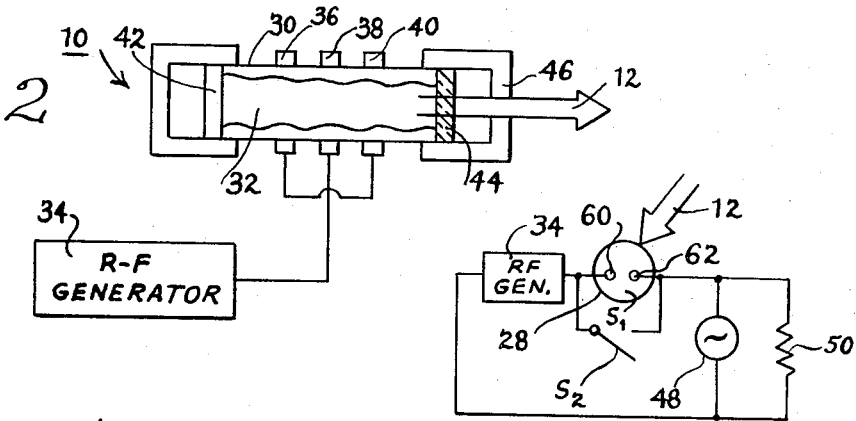
FIG. 2
FIG. 4
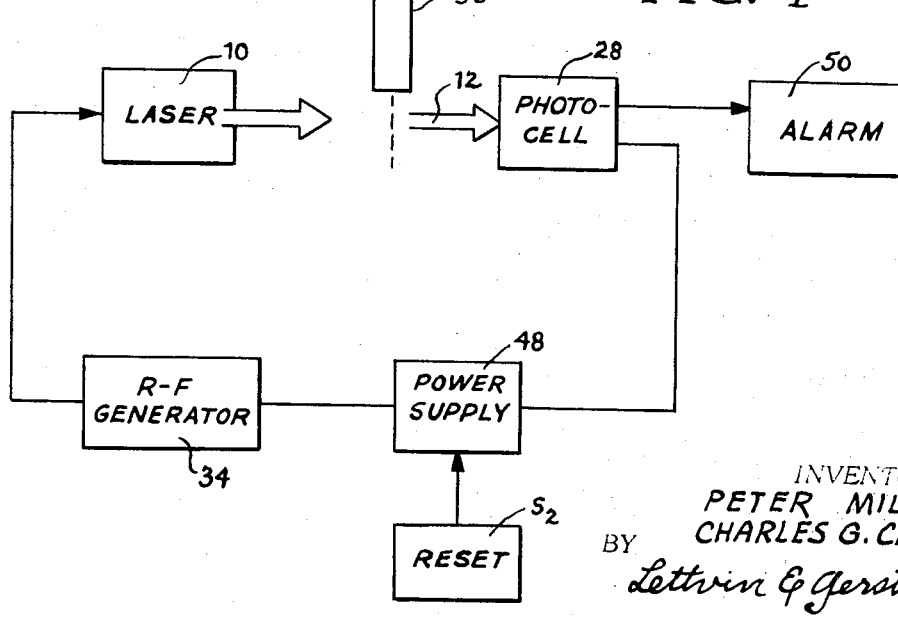
FIG. 3
INVENTORS
PETER MILLER
CHARLES G. CALL
BY
Lettvin & Gerstman
Attorneys

PROPERTY PROTECTION SYSTEM EMPLOYING LASER LIGHT

BACKGROUND OF THE INVENTION

This invention relates generally to a property protection system employing a laser light.

In outside areas such as cemeteries, parks, private grounds and the like, it is often highly desirable to prevent invasion by intruders. The utilization of guards for this purpose is often expensive and ineffective. It is difficult if not impossible for a guard or a group of guards to prevent intruders from entering a large area. Accordingly, it is desirable to provide a property protection system for preventing intrusion into an area to be protected which is both inexpensive and efficient.

A known device in the prior art employs a source of electromagnetic radiation around an area to be protected for actuating an alarm when an object intrudes across the perimeter of the area. This device generally emits a source of electromagnetic radiation having random and varied wave lengths. If such a system were to be employed in an outside area, the electromagnetic energy would demonstrate the property of dispersion. That is to say that the electromagnetic energy of one wave length would be refracted in the air at one angle and energy of a different wave length would be refracted at a different angle. Furthermore, the electromagnetic waves are dispersed or diffused in a random manner according to the wave length of the energy as a result of collision of the waves with particles of the medium traversed. Thus, a strong beam of polychromatic radiation, such as an automobile headlight, rapidly decreases in intensity when passing through a medium such as fog, smog, or the like.

Accordingly, in providing a property protection system for preventing intrusion into an area to be protected, it is desirable to provide a beam of coherent monochromatic electromagnetic energy for traversing the perimeter of the area to be protected such that an alarm may be actuated when the beam is broken by an intruder moving therethrough. It is also desirable to provide a safeguard system for deactivating the generation of the beam of electromagnetic energy so as to avoid any injury to the person or object moving through the beam.

SUMMARY OF THE INVENTION

In a principle aspect, the present invention relates to a property protection system for protecting an outside area. The system employs a source of coherent monochromatic electromagnetic energy for invisibly traversing the perimeter of the area to be protected. An alarm actuating device is provided for signaling an alarm when the beam is broken by an object or a person moving through the beam.

In a preferred embodiment of the property protection system, a safeguard device is included for instantaneously terminating the generation of the beam when the beam is broken by an object or person moving through the beam. Also, a gas laser is provided for generating the monochromatic coherent beam of infra-red electromagnetic energy.

BRIEF DESCRIPTION OF THE DRAWINGS

There is shown in the attached drawing a presently preferred embodiment of the present invention, wherein like numerals refer to like elements and wherein:

FIG. 1 is a perspective view of the property protection system of this invention employed for traversing an area to be protected;

FIG. 2 is a schematic view of the laser gun and radio frequency generator associated with the gun employed in this invention;

FIG. 3 is a block diagram of the laser and circuit components employed in the present invention; and FIG. 4 is a schematic diagram of one embodiment of the present invention.

DESCRIPTION OF THE PREFERRED EMBODIMENT

FIG. 1 shows the property protection system of this device employed for traversing an area to be protected. The system includes a laser gun 10 employed to generate an invisible beam of electromagnetic energy 12. The beam 12 is reflected by mirrors or polished surfaces 14, 16, 18 and 20 around the perimeter of the area 22 to be protected.

The laser 10 is secured to a base or housing 24 and an adjustment knob 26 secured between the laser 10 and housing 24 is employed for varying the angle of elevation of the beam 12 emitted from the laser gun 10. In a preferred embodiment shown in FIG. 1, the beam is directed at an upward angle. The beam 12 traverses the area 22 to be protected in three revolutions or paths A, B and C respectively. A photo cell 28 is secured to a support arm 28a and positioned in the uppermost path C of the beam 12. The beam 12 terminates incident upon the photo cell 28.

In this invention, the means employed for generating a coherent monochromatic beam of electromagnetic energy is a gas laser gun 10 shown in greater detail in the schematic diagram of FIG. 2. The laser gun 10 produces a coherent monochromatic beam of electromagnetic energy in the infra-red portion of the spectrum. The particular laser of this invention employs an enclosed tube 30 having a mixture of helium and neon gases 32 contained therein.

In the helium-neon gas laser 10, a radio frequency signal is produced by an RF generator 34 and passed through the gas mixture 32. This RF signal is employed for providing a pumping or exitation energy to the gas. The energy is transmitted from the RF generator 34 to the gas mixture 32 through three electrodes 36, 38, and 40. The energy from the RF generator 34 causes a number of atoms to be ionized in order to free electrons. These free electrons in turn collide with the helium gas atoms, exciting them to higher energy levels. The energy level of an excited helium atom is identical with the energy level of an excited neon atom. Accordingly, a collision of an excited helium atom with a nonexcited neon atom allows the transfer of the energy of the excited helium atom to the neon atom. When the neon atom returns to its lower energy level it emits photons which contribute to the energy of the laser beam. Because of the nature of the neon atom, each of these photons has an identical wave length. The output laser beam is increased in energy by repeatedly traversing a path between reflecting end plate 42 and reflecting exit plate 44. Finally, the laser beam 12 is passed through exit window 46.

The beam 12 is composed of waves of electromagnetic energy having identical frequencies and being in phase.

This is another way of saying that the laser beam 12 is monochromatic and coherent. Because the laser beam 12 is monochromatic and coherent, it exhibits very little scattering and dispersion. Also, the output beam is collimated to a great degree. Accordingly, it is possible for the beam 12 to traverse a great distance even through fog, smog, and the like, without losing its intensity.

In the preferred embodiment, a gas mixture of helium and neon was used. The helium-neon gas laser 10 employed in the preferred embodiment of this invention emits a beam of light in the infra-red spectrum. As energy in this spectrum is not visible to the human eye, the beam 12 will be invisible as it traverses the area 22 to be protected. It is to be noted, however, that other gases may be employed in a gas laser and that other lasers may be employed in producing a monochromatic coherent beam of electromagnetic energy. For example, crystal lasers such as a ruby laser and injection solid state lasers are available and may be employed without departing from the principles of this invention.

It has been found that the RF generator 34 generating a frequency within the range of 25–30 megahertz will transfer sufficient energy to the gas for exciting the helium atoms. Such a generator 34 will have power requirements in the range of 20–150 watts. Employing such a device, it is possible to produce a beam in the range 0.25 milliwatts to 100 milliwatts with relatively small power input requirements. The gas laser 10 is available in sizes less than 1 foot in length. For example, a gas laser has been built by Bell Telephone Laboratories having a discharge tube of two inches in length. Because the size requirements of the laser 10 are minimal, it is easily possible to conceal the device.

As shown in FIG. 3, a photo cell 28 is provided to intercept the beam 12. As has been mentioned, the beam 12 is in the infra-red portion of the spectrum. Accordingly, it is desirable to employ a solid state lead-sulfide cell which is particularly suitable for use with an infra-red source of electromagnetic energy. Such a cell 28 is conductive or short circuited when electromagnetic energy in the infra-red portion of the spectrum is incident thereon and is nonconductive or open circuited when no such energy is incident thereon.

The block diagram of FIG. 3 shows the property protection system of this invention having a laser gun 10 emitting a beam 12 incident on a photo cell 28. The photo cell 28 is shown with outputs applied to a power supply 48 and to an alarm 50. The output of the power supply 48 is applied to the RF generator 34. The RF generator "pumps" the laser 10 causing it to emit the beam 12 as has been described. In a preferred embodiment, as shown in FIG. 4, the electrodes 60 and 62 of the photo cell 28 act as a single pole single throw switch $S_1$. The switch $S_1$ is closed or conducting when infra-red energy is incident thereon and open when the supply of infra-red energy is terminated. The switch $S_1$ is in series connection with a conductive loop of the power source 48 and the RF generator 34. The alarm load 50 is shunted across the power supply 48. The alarm load 50 is selected to have an impedance substantially greater than of the RF generator. Accordingly, when the switch $S_1$ is conducting, substantially all current from the power supply 48 is delivered to the RF generator 34 for the operation of the laser 10. But when the beam 12 is broken, the switch $S_1$ is opened. Thus, current from the power supply 48 is applied to the alarm 50 for signaling the breaking of the beam 12. A reset control switch $S_2$ for initiating conduction of power to RF generator 34 is also provided. The alarm 50 may take any one of numerous forms known to one skilled in the art. The alarm may, for example, be a signal generator tuned to a predetermined frequency for signaling a remote location such as a police station or security office.

In the operation of this system, power from a power supply 48 is initiated by momentarily closing the normally open reset switch $S_2$. Thereafter, the switch $S_2$ is open circuited. The RF generator 34 supplies radio frequency energy for pumping the laser 10. The laser in turn generates a monochromatic coherent beam of infra-red electromagnetic energy 12 which terminates incident upon the photo cell 28. When energy in the infra-red spectrum is incident on the photo cell 28, the cell 28 is in the conducting mode between conducting electrodes 60 and 62. Thus, the power from power supply 48 is conducted through the electrodes 60 and 62 to the RF generator 34. When an object 58, such as an intruder, passes through the beam of laser light 12, the beam 12 is no longer incident on the photo cell 28 and the switch $S_1$ of photocell 28 is opened. Accordingly, the photo cell is placed in the nonconductive mode and power from the power supply 48 is no longer conducted to the RF generator 34.

Because the laser beam 12 is a highly concentrated energy source, it is possible that the beam could injure the intruder. For example, injury could result to the retina of the human eye. The fact that the beam is undetectable makes such a result more likely. Accordingly, the property protection system of this invention is provided with a safeguard system whereby the laser beam 12 is terminated when an object such as an intruder crosses its path.

When the switch $S_1$ is opened in response to the breaking of the beam 12, power can no longer be delivered from power source 48 to RF generator 34. Thus, the laser 10 is shut down. And the intruder's presence is sensed with no resulting injury to the intruder. The alarm may take any one of numerous forms known to one skilled in the art.

What is claimed is:

1. A property protection system for protecting an outside area comprising, in combination: means for emitting a coherent monochromatic beam of electromagnetic energy, to be deflected around the perimeter of the area to be protected; beam responsive means for actuating an alarm signal when said beam is broken by an object moving therethrough such that said alarm is activated whenever an intruder passes through a portion of said beam; safeguard means for instantaneously terminating generation of said beam when said beam is broken by an object moving therethrough; a generator for operating said means for emitting the beam wherein said means for actuating the alarm comprises a photosensitive element having conducting electrodes and a power supply; said safeguard means comprising in series said conducting electrodes, power supply and generator, and an electrically actuated alarm having substantially greater impedance than said generator in shunt connection across said power supply such that when said beam is broken by an object moving therethrough, current from said power supply normally conducted across said electrodes to said generator is shunted through said alarm for actuating said alarm.

2. The system of claim 1 including a reset switch in shunt connection with said electrodes such that closure of said switch delivers power to said generator for reactivating said means for emitting the beam.

* * * * *